Figure 1:
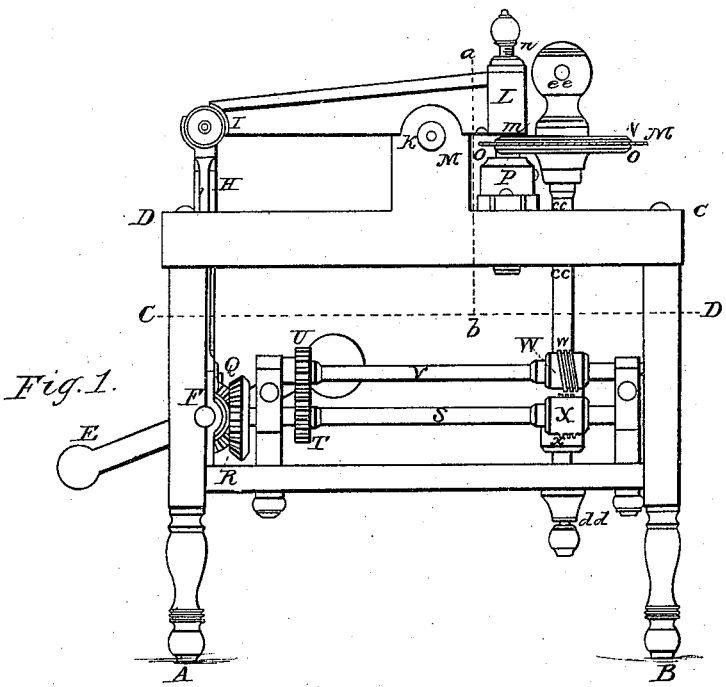

E. Carver.
Cutting Saws.

№ 1,717.                    Patented Aug. 12, 1840.

Sheet 1, 3 Sheets.

Witnesses.
Caleb L. Hunt
Hilea Wilbur

Inventor.
Eleazer Carver

Sheet 2, 3 Sheets.
E. Carver.
Cutting Saws.
N° 1,717. Patented Aug. 12, 1840.
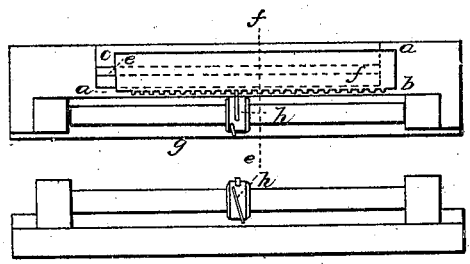
Fig. 6.
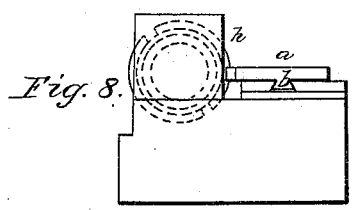
Fig. 7.
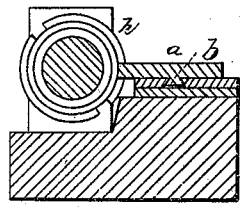
Fig. 8.
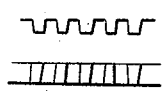
Fig. 10.
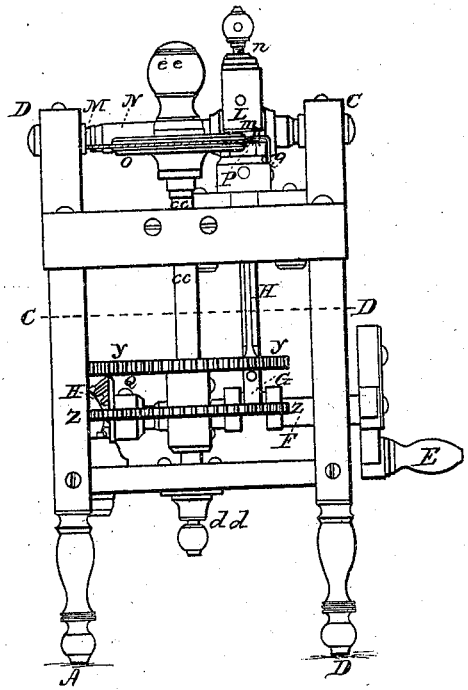
Fig. 2.
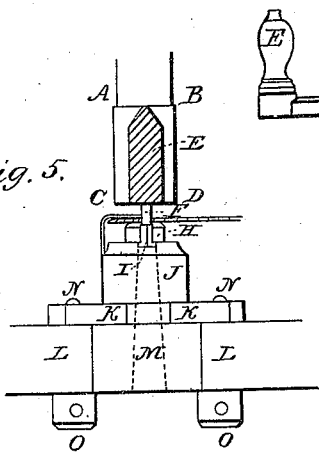
Fig. 5.
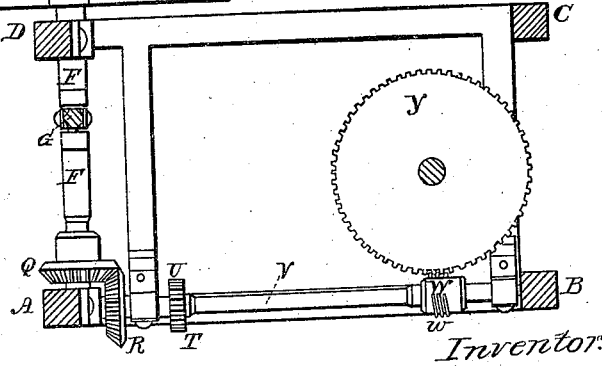
Fig. 4.
Witnesses.
Caleb J. Hunt
Kilburn Wilbur
Inventor:
Eleazer Carver E. Carver.
Cutting Saws.
N°. 1,717.   Patented Aug. 12, 1840.

Sheet 3, 3 Sheets.

Witnesses
Caleb J. Hunt
Hiles Wilbur

Inventor:
Eleazer Carver

UNITED STATES PATENT OFFICE.

ELEAZER CARVER, OF BRIDGEWATER, MASSACHUSETTS.

MACHINE FOR CUTTING THE TEETH OF CIRCULAR SAWS.

Specification of Letters Patent No. 1,717, dated August 12, 1840.

*To all whom it may concern:*

Be it known that I, ELEAZER CARVER, of Bridgewater, in the county of Plymouth and State of Massachusetts, have invented a new and useful Machine for Cutting Teeth on Circular or Straight Saws; and I do declare the following to be a full and exact description thereof.

My invention consists in a new manner of cutting saw teeth on circular or straight saws, by giving them a regularly intermittent motion while passing between a die and anvil, and during their intervals of motion, holding the plate firmly and steadily so as to cut smooth, equal and equidistant teeth on all saw plates.

As my design in constructing this machine was more particularly for the purpose of cutting the teeth on the circles, or circular segments of which the saws of cotton gins are composed, I will first describe the machine as adjusted to that purpose, but the same may be applied to the cutting the teeth on other circular saws, and by a modification, hereafter described, to the cutting the teeth on straight saws.

The circular saw-plate is confined between two strong circular metal plates of less diameter than the segments or circles to be cut, attached to an upright shaft. Of these two metal plates, the lower one is fastened to the upright shaft or axis: and the other or upper one is held down upon the saw plate, according to the form or kind of plate to be cut. If a whole circle is to be cut, the upper plate should be whole and fastened down upon the saw by means of a nut or spring-catch upon the upright shaft so that the saw plate shall turn with the shaft. If it is desired to cut teeth on semicircular segments such as are used for saw-gins then of the two plates between which the saw is confined, the one that is movable should be divided into two equal parts or half disks and held tight against the segments by means of a stiff spring. And the two parts of it should be connected by two metal straps having a hinge joint at each end so that one half may be raised by a lever, or some other contrivance without stopping the machine. And the corresponding segment may be removed and a new one inserted, while the other segment is being cut, all which is more fully shown by the drawing annexed. On this same shaft to which the saw plate is confined are two cog-wheels, each having the same number of teeth as are to be cut in the circumference of the saw. These two cog-wheels are both made fast to the shaft one above the other and so far apart as to allow the play of the two cylinder-wheels hereafter described: the lower one of these cog-wheels has its teeth cut straight, that is, perpendicular to the plane of the wheel, the other has its teeth cut bevelling or oblique to the plane of the wheel. The teeth of these cog-wheels play into threads raised up on two small cylinder-wheels, which are fixed upon two horizontal shafts parallel to each other, and one directly over the other. Of these cylinders, the upper one has oblique threads like those of an endless screw, extending half around it, corresponding with and playing into the oblique teeth of the upper cog-wheel, the lower cylinder has straight threads, that is perpendicular to its axis, extending half around its circumference but on the side opposite to that on which the threads of the other cylinder are placed these straight threads play into the straight teeth of the lower cog-wheel. These two cylinders have an equal motion, the shaft of the upper one being turned by a small cog-wheel on the end of it playing into an equal cog-wheel on the shaft of the lower cylinder. The diameters of these two cylinders are the same and their diameter, and the obliquity of the thread of the upper one are such in proportion to each other, that each revolution of the upper cylinder wheel will turn the upper cog-wheel the distance of one tooth of the wheel: but the threads of that cylinder wheel extending only half around its circumference and the other cylinder wheel having straight threads on its opposite side playing into the lower cog-wheel, the upper cylinder-wheel will during that half of its revolution in which its threads play into the teeth of the upper cog wheel, turn that wheel and its shaft the distance of one tooth: the threads of that cylinder wheel then being disengaged from the teeth of the cog wheel, the straight threads of the lower cylinder strike into the straight teeth of the lowewr wheel and hold it and the shaft still during the other half revolution of the two cylinders, and until the threads of the upper cylinders strike again into the teeth of the upper wheel: and so on, alternately giving to the two cog-wheels, and the shaft, and the saw-plate an intermitting motion at equal intervals: each movement being equal to the distance between two contiguous teeth of the saw to be cut: and the saw-plate being during the intervals of motion held firmly in its place while the tooth is cut. But in cases where it is desired to cut teeth on circles or segments more than three eighths of an inch apart, I should prefer having but one cog-wheel attached to the upright shaft, and only one horizontal shaft and cylinder wheel, which wheels should be constructed with cogs and threads in the same manner as is hereafter described for moving and holding the straight rack when cutting the teeth of straight saws. If it be desired to cut a greater or smaller number of teeth in the saw, than the number of cogs in the cog-wheels, the effect may be produced by intermediate wheels between the cylinder and cog-wheels, accelerating or retarding the motion of the cog-wheels. The operation of cutting the teeth is performed by the following described parts of the machine.

On the shaft of the lower cylinder and on the end of it opposite to that near which the cylinder is fixed is a miter wheel playing into another similar wheel on one end of another horizontal shaft running at right angles with the shafts of the cylinders, and to the other end of the shaft, on which the second miter wheel is fixed, the moving power of the machine is applied by means of a simple winch if the machine is moved by hand, or in such other way as shall be convenient if moved by any other power. The last mentioned shaft is bent into a crank at a point convenient for adjusting the cutting apparatus now to be described.

To this crank an upright bar is adjusted which by a turning joint at its upper end is connected with the end of the long arm of a horizontal beam or lever, in the end of the short arm of which, is fixed in a vertical position, a triangular die or punch which falls into a corresponding cavity in a small anvil under it. The crank, bar, and lever are so adjusted, as to place, and proportions that the edge of the saw plate shall pass between the punch and the anvil so that the punch when it comes down, shall cut into the plate just deep enough to form the teeth as required, by cutting out a triangular piece of the plate between the teeth. The punch is so fixed in the end of the lever, that by means of a screw, it can be raised or lowered so as to sink more or less deeply into the cavity in the anvil. A thin piece of metal is screwed on to the side of the anvil, which rises as high as the edge of the saw-plate, and is then bent over upon it, so as to assist in keeping the plate steady while the punch cuts the tooth and rises again. And at the same time the edge of this piece of metal is cut so as to serve in some measure as a guide to the punch in coming down upon the plate.

The boxes for the gudgeons or fulcrum of the punch lever, the beds upon which the anvil and the upright shafts by which the saw is made to revolve, rest, and the boxes in which the gudgeons of the two horizontal cylinder shafts play, may all be made movable so as to be adjusted by screws, so that the same machine may cut saws of different diameters—or give different pitches to the teeth if desired. And the two horizontal cylinder wheels with oblique and straight threads may also be made movable on their shafts and fastened thereto by screw-nuts fitted on to the shafts, so that they may be accommodated to any change in the position of the upright cog wheel shaft, or to the use of the intermediate cog-wheels as before mentioned.

The two portions of the machine, viz., the turning part, and the cutting part are so mutually adjusted that the oblique threads of the upper cylinder shall play into the teeth of the upper cog-wheel and so move the saw-plate during the half revolution of the crank in which it passes the lower dead point, and that the straight threads of the lower cylinder, shall play into the teeth of the lower cog-wheel, and so hold the saw plate still, during that half revolution of the crank in which it passes the upper dead point.

If the machine is to be applied to the cutting of straight saws it may be done by substituting for the two cog-wheels just above described a straight rack with teeth alternately straight and oblique: and for the two cylinders, one cylinder upon a shaft parallel to the rack and having a straight thread half way around its circumference, and an oblique thread around the other half. If a straight saw plate be fixed to this rack, and the rack be made to slide between guides so as to carry the edge of the saw-plate along under the punch. The threads of the cylinder as above described will by working alternately in the straight and oblique teeth of the rack give the rack and saw plate the same intermitting motion as the apparatus before described gives to the circular plate. The other parts of the machine may be similar to, or the same as the before described. This however I suggest merely as a modification of the machine for the convenience of those who may use it and to prevent any one from claiming it here after as his own invention.

I will now proceed to described my said machine by reference to the drawings annexed.

Figure 3:
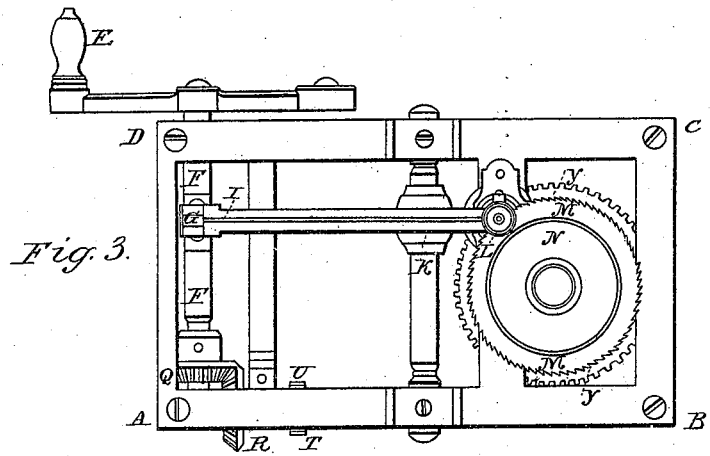

Figure 1 is a side elevation. Fig. 2, is an end elevation. Fig. 3, is a plan as seen from above, and Fig. 4, is a horizontal section exhibiting a plan as seen from above of those parts below the dotted line C D, in Figs. 1 and 2. In these several figures the Roman letters A, B, C, D, represent the four corners of a strong rectangular frame, to which the several parts of the machine are fixed. E is the handle or winch that gives motion to the machinery if turned by hand turning the the shaft F, and the crank G, which gives a vertical motion to the bar H, and the long arm of the lever I, which is supported on the fulcrum K, and into the short arm of which L, at the bottom is inserted the die or punch $m$, which is raised or lowered by the screw $n$, at pleasure. M, is the saw plate to be cut.

N, is the upper plate that confines it, and O, is the lower plate. P, is the anvil. $g$ is the piece of metal fastened to the anvil and bent over upon the saw plate to keep it steady and to guide the punch. The foregoing are the parts that perform the operation of cutting.

The shaft F, while it moves the bar H, up and down by the crank G, also turns the miter wheel Q which turns the other miter wheel R, and its shaft S which by means of the two cog wheels T, U, turns the upper shaft V, and thus turning the upper cylinder W, with the oblique threads $w$, and the lower cylinder X, with the straight threads $x$.

Y, is the upper cog wheel with oblique teeth.

Z, is the lower cog wheel with straight teeth.

$c, c$, is the shaft of the two cog wheels, on which the saw plate is fixed, which is raised or lowered for adjustment by a screw at the bottom.

$d\ d$—$e\ e$, is the nut by which the saw plate and the plate above it are screwed down to the lower plate.

Fig. 5, shows the detail across the line $a, b$, in Fig. 1. A, B, C, D, is the head of the short arm of the lever into which the punch is inserted. The shaded part E, shows the junction of the lever with the head or an end view of the lever without the screw that raises and lowers the punch. F is the punch. G, is the saw plate. H, is the anvil. I is the cavity of the anvil which is open on the side toward the spectator in this view which is also the side toward the fulcrum of the lever, and to allow the chips cut from the saw to fall out readily the opening I, is enlarged below through the block J, which is screwed on to the transverse arm L L, which supports the anvil by the screws N O, N O. M is the enlarged opening through the block and transverse arm.

Figs. 6, 7, 8, 9, and 10, show the straight rack and the cylinder for cutting straight saws. Fig. 6, $a, b, c, d$, is the rack which slides in the groove $e\ f$. $h$ is the cylinder in Figs. 6 and 7. In Figs. 8 and 9,—$h$ is the cylinder, $a$ is the rack—$b$ is the groove in which it slides. Fig. 10, shows enlarged views of the teeth of the rack in plan and elevation.

Figure 11:
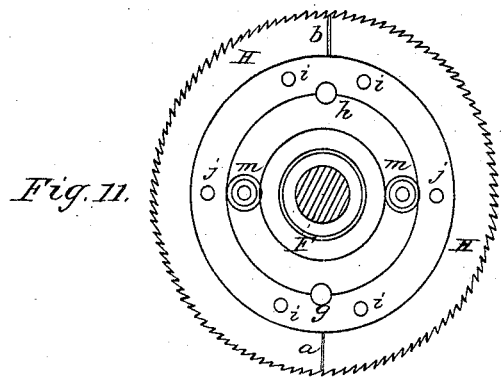
Figure 12:
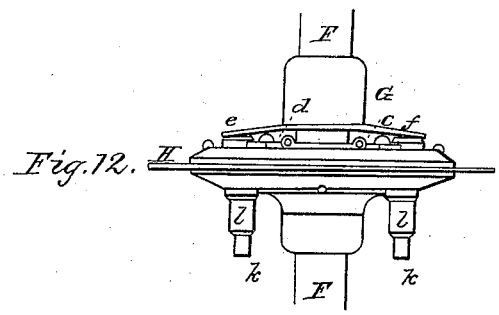
Figure 13:
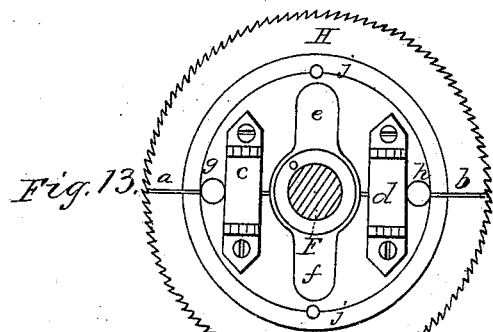

Figs. 11, 12, 13, show the detail of the method of confining the circular segments of saws to be cut. Fig. 11, shows the detail of one of the metal plates which is fastened permanently to the shaft F. Fig. 13, the other and movable one. Fig. 12, shows a profile of the plates and the saws as adjusted for cutting the teeth. In Fig. 13,—$a, b$, is the line of division between the halves of the plate,—$c, d$, are the metal straps with hinges at each end by which the halves of the movable plate are connected,—$e, f$, is a spring which is fastened to the shaft, and presses the movable plate against the saw H, and $g, h$, are screw-holes in both plates the screws being made fast in the whole plate and playing loose in the holes of the divided plate, the object of the screws being to keep the plate in their relative position with each other, and also to serve as guides by which to adjust the segments to be cut—small quadrants being cut on the inner corners of the segments to fit the body of the screw. $i, i, i, i$, are holes in which pins are made fast into one of the plates and enter into corresponding holes in the other to aid in keeping saw plates steady. $j, j$, are holes for two pin that are fixed in one plate, and pass through holes in the segment and enter into corresponding holes in the other for the same purpose. In Fig. 11, $m, m$, are two plugs that slide in the tubes $l, l$, in Fig. 12, of which the ends are shown out at $k, k$. The object of these is to press the plates apart when a segment is to be taken out, or inserted, which plates are pressed back again by the spring $e, f$.

What I claim as my invention and desire to secure by Letters Patent, is—

The machine above-described, consisting in a combination of the said several parts for giving a regularly intermitted motion to the circular saw plate, and for holding the same still and steady in the intervals of motion and of the parts for cutting the teeth.

<div style="text-align: center;">ELEAZER CARVER.</div>

Witnesses:
  CALEB J. HUNT,
  KILEA WILBAR.